(12) United States Patent  
Niikawa

(10) Patent No.: US 6,947,075 B1
(45) Date of Patent: Sep. 20, 2005

(54) PHOTOGRAPHIC APPARATUS HAVING DISPLAY FOR DISPLAY OF A NETWORK AND NETWORK SYSTEM

(75) Inventor: Masahito Niikawa, Sakai (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/291,066

(22) Filed: Apr. 14, 1999

(30) Foreign Application Priority Data

Apr. 17, 1998 (JP) .................................. 10-108159

(51) Int. Cl.⁷ ...................... H04N 5/225; H04N 5/232; H04N 5/222
(52) U.S. Cl. .............................. 348/211.14; 348/207.1; 348/207.2; 348/333.1; 348/333.2
(58) Field of Search .................... 348/207.1, 207.2, 348/211.14, 333.1, 333.2, 333.02, 333.01, 348/333.09, 14.03

(56) References Cited

U.S. PATENT DOCUMENTS

| | | | |
|---|---|---|---|
| 5,479,206 A | 12/1995 | Ueno et al. | |
| 5,568,183 A | 10/1996 | Cortjens et al. | |
| 5,963,208 A * | 10/1999 | Dolan et al. | 345/760 |
| 6,061,695 A * | 5/2000 | Slivka et al. | 715/513 |
| 6,141,052 A * | 10/2000 | Fukumitsu et al. | 348/373 |
| 6,225,999 B1 * | 5/2001 | Jain et al. | 345/734 |
| 6,397,268 B1 * | 5/2002 | Cepulis | 710/8 |
| 6,535,243 B1 * | 3/2003 | Tullis | 348/207.1 |
| 2001/0010543 A1 * | 8/2001 | Ward et al. | 348/207 |
| 2001/0019359 A1 * | 9/2001 | Parulski et al. | 348/207 |

* cited by examiner

Primary Examiner—Wendy R. Garber
Assistant Examiner—James M. Hannett
(74) Attorney, Agent, or Firm—Burns, Doane, Swecker & Mathis, LLP

(57) ABSTRACT

A photographing apparatus is connectable to a network to which a plurality of image processing apparatuses are connected via cables or by wireless. The photographing apparatus comprises an interface for connecting the photographing apparatus to the network, a display for displaying the network structure, and an operation unit for allowing image data taken by the photographing apparatus to be processed on the network.

18 Claims, 14 Drawing Sheets

DISPLAY SCREEN OF THE DIGITAL CAMERA FOR PRINTING OUT THE PHOTOGRAPHED IMAGE DATA

SCREEN OF PC (D12)

SCREEN OF DIGITAL CAMERA (D12)

SCREEN OF PC (D13)

SCREEN OF DIGITAL CAMERA (D13)

DISPLAY AREA CHANGE IN ACCORDANCE WITH
DISPLAY MAGNIFICATION RATES CHANGE AT
DIGITAL CAMERA    (D11)

50% DISPLAY AT DIGITAL CAMERA    (D20)

100% DISPLAY AT DIGITAL CAMERA    (D30)

WARNING SCREEN AT PC (D40)

WARNING SCREEN AT DIGITAL CAMERA (D40)

REGISTRATION OF ACTION TO FUNCTION KEY (D50)

```
┌─────────────────────────────────────────────────────┐
│          REGISTRATION CHANGE OF F1 KEY              │
├─────────────────────────────────────────────────────┤
│ TRANSFER DATA                                    10 │
│                                                  ── │
│ SPECIFY FOLDER TO WHICH DATA ARE TRANSFERRED        │
│                                                     │
│ CHANGE SCREEN DISPLAY MAGNIFICATION                 │
│                                                     │
│ TURN OFF POWER SOURCE OF PC                         │
│                                                     │
│ DISPLAY IMAGE DATA IN PC                            │
│                                                     │
│ EXECUTE APPLICATION IN PC                           │
│                                                     │
│ TRANSFER IMAGE TO PC IMMEDIATELY AFTER              │
│ PHOTOGRAPHING                                       │
├─────────────────────────────────────────────────────┤
│ PRESS UP KEY/DOWN KEY TO SELECT CONTENT OF          │
│ REGISTRATION AND PRESS SHUTTER BUTTON TO EFFECT     │
└─────────────────────────────────────────────────────┘
```

FIG.13

PHOTOGRAPHIC APPARATUS HAVING DISPLAY FOR DISPLAY OF A NETWORK AND NETWORK SYSTEM

The present invention claims priority based on Japanese Patent Application Serial No. H10-108159, the contents of which are incorporated hereinto by reference in its entirety.

BACKGROUND OF THE INVENTION

1. Field of the Invention

This invention relates to a photographing apparatus which can be connected to a network system, in which a plurality of computers (e.g., personal computers which may be abbreviated as PCs) are connected to the network, and to such a network system.

2. Description of the Related Art

A network system, in which a plurality of computers are connected to the network, allows the software sources included in that network to be shared by the connected computers, and information to be exchanged as sources by e-mail. The hardware sources, including data storage media, such as the hard discs of other PCs connected to this network, and the peripheral apparatuses, such as printers and modems, can also be shared by one another. Since the performance of each computer can be enhanced via the network, in addition that the computer itself is becoming more user-friendly, the network system is rapidly spreading.

On the other hand, digital cameras have also been becoming popular because they do not require development of the films. A digital camera photoelectrically converts the optical image of an object into digital image data by charge coupled devices (CCD). The digital image data is recorded in a recording medium, such as a memory card. The recorded image is reproduced by predetermined manipulations, and is displayed on the display panel of the digital camera. The recorded image can also be deleted, or copied into PCs. Such Digital cameras are being widely used as peripheral apparatuses of PCs, and the functions of each type of digital camera are rapidly progressing.

If a digital camera is incorporated in the above-described network system, the digital camera will be able to use the sources of the network system, and the dimensions of the network media will be enlarged.

Although the recorded images of the conventional digital camera can be copied into a computer (PC) by manipulations on the PC side, the main purposes reside in merely storing and reproducing the recorded images in the PC. In other words, the conventional digital camera is no more than one of the external apparatuses of the PC, and little technological consideration has been made to active use of the network sources.

In order to incorporate the conventional digital camera into a network system, special performances and functions must be added. In this case, the power consumption, as well as the size of the digital camera, inevitably increases. In the present circumstances, it is difficult to incorporate a digital camera into a network system to allow mutual interaction with other apparatuses in the network without extra cost and functions.

SUMMARY OF THE INVENTION

Therefore, it is an object of the present invention to overcome these problems in the prior art, and to provide a photographing apparatus which can easily and rapidly use the network sources by manipulations on the digital camera side, without adding special functions and performances to the digital camera.

It is another object of the present invention to provide a network system, to which the above photographing apparatus is connected.

In order to achieve these objects, in one aspect of the present invention, a photographing apparatus connectable to a network to which a plurality of image processing apparatuses are connected via cables or by wireless is provided. This photographing apparatus comprises an interface for connecting the photographing apparatus to the network, a display for displaying a network structure, and an operation unit for allowing image data taken by the photographing apparatus to be processed on the network.

With this photographing apparatus, the user can see the network structure on the display, and can treat the photographed image data as a source on the network by manipulating the operation unit, while monitoring the display. This photographing apparatus can function as a part of the network system without requiring extra high-performance functions, and allows the user to use the network sources at any time.

Since no additional high-performance functions are required, the photographing apparatus can be kept compact without increasing the power consumption.

BRIEF DESCRIPTION OF THE DRAWINGS

The above and other objects, features, and advantages of the present invention will be apparent from the following detailed description of the preferred embodiments with reference to the attached drawings, wherein:

FIGS. 10(a)–10(c) illustrate the display screen of the digital camera when the function F3 is manipulated in the folder designation window, wherein FIG. 10(a) shows the window of the display area, FIG. 10(b) shows the 50% view on the digital camera, and FIG. 10(c) shows the 100% view on the digital camera;

FIG. 11(b) illustrates the corresponding display screen of the digital camera;

FIG. 13 illustrates the display screen of the digital camera, through which a desired action can be registered;

DETAILED DESCRIPTION OF THE PREFERRED EMBODIMENTS

Figure 1:
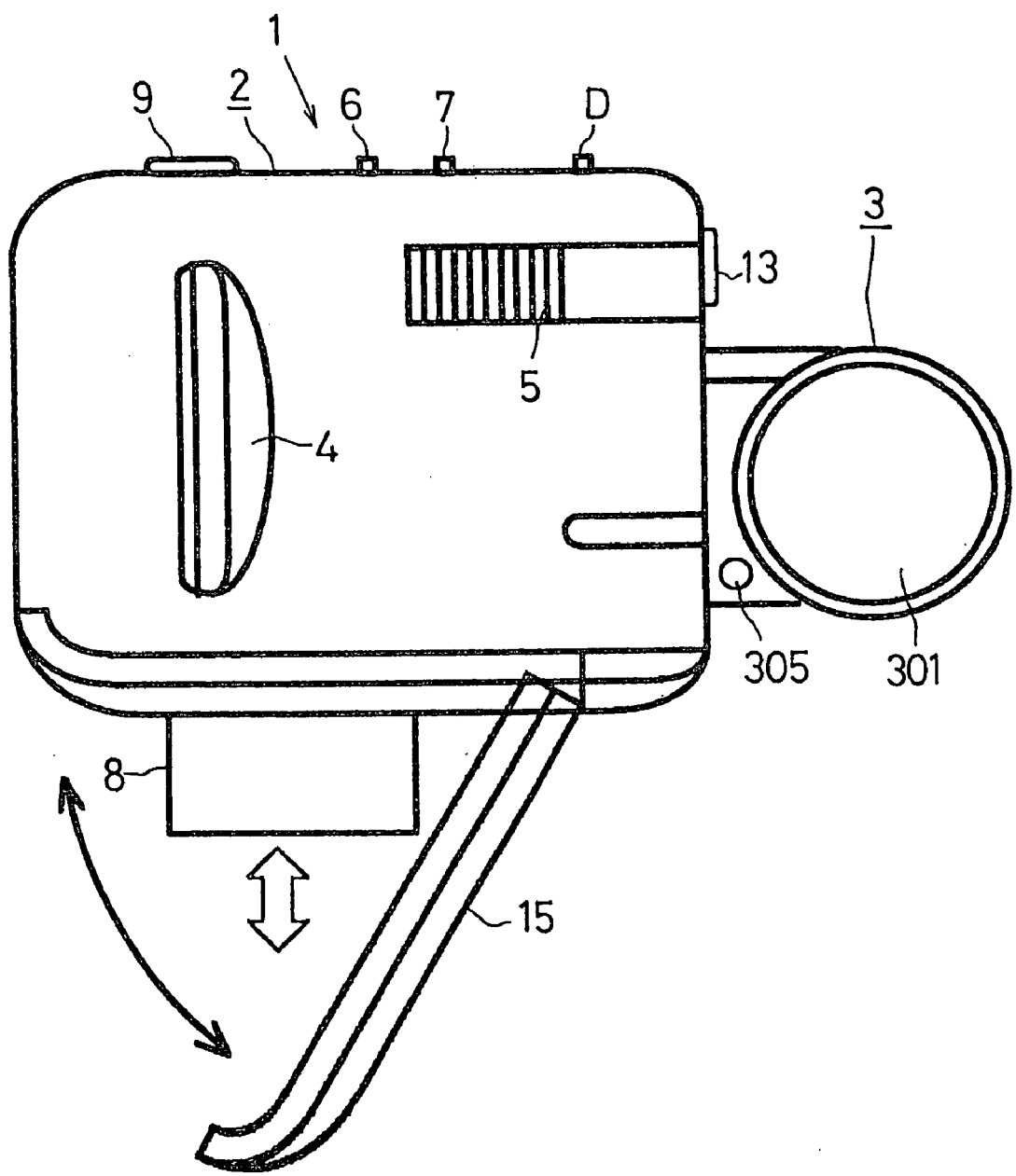
FIG. 1 is a front view of the digital camera used in the network system according to an embodiment of the present invention.
Figure 2:
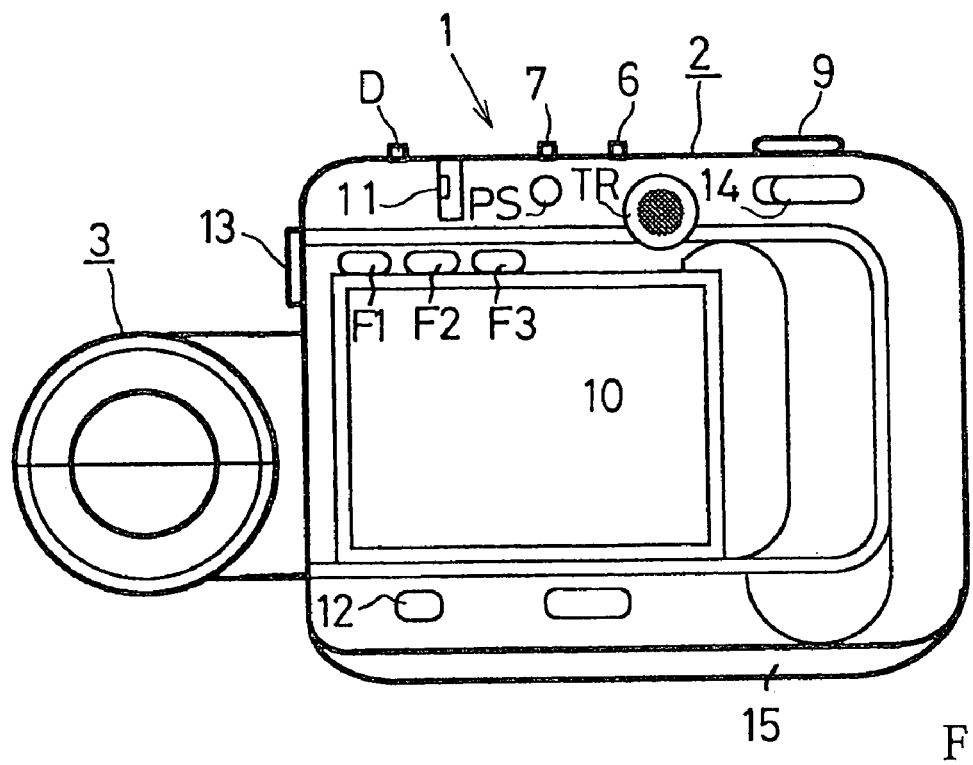
FIG. 2 is a rear view of the digital camera shown in FIG. 1.
Figure 3:
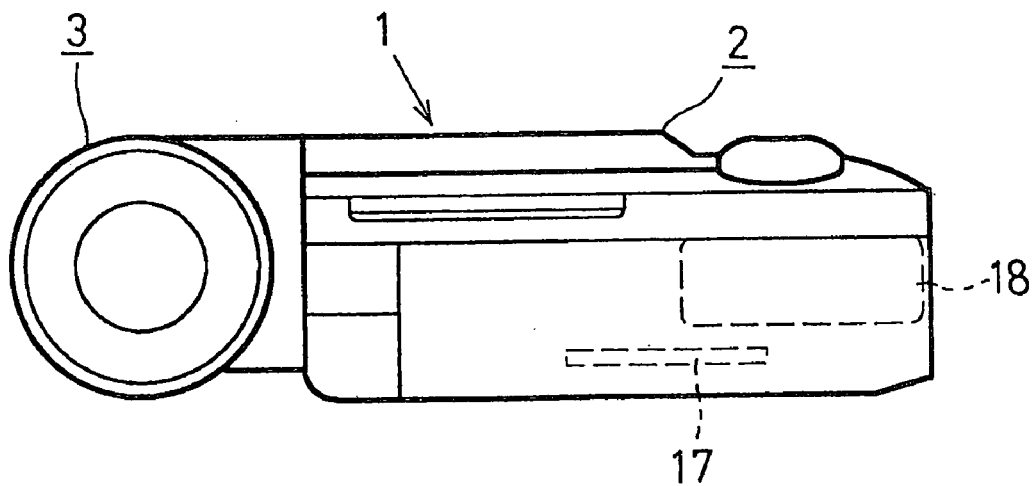
FIG. 3 is a bottom view of the digital camera shown in FIG. 1.

FIGS. 1–3 illustrate a digital camera used in a network system according to one example of the present invention.

The digital camera 1 comprises a camera frame, which is referred to as a main body 2, and a photographing unit 3 which is attachable to and removable from the main body 2 on the right side of the main body 2 in the front view shown in FIG. 1. The photographing unit 3 is pivotable within a plane parallel to the right side of the main body 2.

The photographing unit 3 has an image pick-up device comprising a zoom lens 301 and a photoelectric conversion device such as a CCD (Charge Coupled Device) array, to convert the optical image of an object into an electric image consisting of charge signals, each of which was generated by each pixel of the CCD via photoelectric conversion. The main body 2 has a display or LCD (Liquid Crystal Display) 10, a slot 17 for receiving a memory card 8, and a connection terminal 13 for connecting the digital camera to the outside apparatus. The image signal taken by the photographing unit 3 is subjected to a prescribed image processing in the main body 2. The processed image is displayed on the LCD display 10, recorded into the memory card 8, or transferred to the PC.

A zoom lens 301 is provided in the photographing unit 3. An image pick-up circuit including a CCD color area sensor 303 is located at an appropriated position behind the zoom lens 301. A light adjusting circuit 304 having a photo sensor 305 for receiving flash light reflected from the object is provided at an appropriated position in the photographing unit 3.

As shown in FIG. 1, a grip 4 is formed in the left-hand side of the front face of the camera main body 2, and a built-in flash device 5 is provided in the right-hand upper side at an appropriate position. Frame forward and backward switches 6 and 7 are provided near the center of the top face of the main body 2 as shown in FIG. 2. The forward switch 6 feeds the frame in the direction that the frame number increases in the photographed order, and is referred to as an UP key 6. The backward switch 7 feeds the frame in the direction that the frame number decreases, and is referred to as a DOWN key 7. A delete key D for deleting the images recorded in the memory card 8 is provided on the left of the DOWN key 7, and a shutter button 9 is provided on the right of the UP key 6 in the rear view shown in FIG. 2.

As shown in FIG. 2, an LCD 10 is provided in the middle of the left-hand side of the rear face of the camera main body 2. The LCD 10 functions as a view finder during photographing, and as a display during the reproduction of the recorded image. A compression rate setting slide switch 12 for switching the compression rate K of the image date to be recorded in the memory card 8 is positioned below the LCD 10. A USB (Universal Serial Bus) connection terminal 13 is positioned on the side face of the main body 2 near the photographing unit 3. A power switch PS is provided on the top of the rear face of the main body 2.

Further, a trackball TR used as a cursor direction means for the LCD 10 is provided at the right-upper side of the LCD 10. Provided at upper side of the LCD are function keys F1, F2 and F3 for executing a set specific function. Each function key enables to select and register the action when the key is pressed, and the registered content is stored in a nonvolatile memory (not shown) in the general controller 211.

The flash device (which may be abbreviated as FL) of the digital camera 1 has an "automatic flash mode", a "forcible flash mode", and a "flash prohibition mode". In the "automatic flash mode", the built-in flash device 5 automatically emits flash light according to the luminance of the object. In the "forcible flash mode", the built-in flash device 5 forcibly emits flash light regardless of the luminance of the object. In the "flash prohibition mode", light emission of the built-in flash device 5 is prohibited. Every time the user presses the FL mode setting key 11 positioned above the LCD 10 on the rear face of the main body 2, the flash mode is switched among three modes in a cyclic order. The digital camera 1 has a 1/8 compression rate and a 1/20 compression rate, and the user can select the preferred compression rate K. For example, if the compression rate setting switch 12 is shifted to the right, the compression rate K is set to 1/8, and if it is shifted to the left, the compression rate K is set to 1/20. Although, in this embodiment, the compression rate K is set to two values, it may be set to three or more values.

A photographing/reproduction mode setting switch 14 is positioned at the top right of the rear face of the main body 2. Digital pictures are taken in the photographing mode. In the reproduction mode, the digital images recorded in the memory card 8 are reproduced and displayed on the LCD 10. The photographing/reproduction mode setting switch 14 is also a bicontact slide switch. For example, if the switch is shifted to the right, the reproduction mode is selected, and if shifted to the left, the photographing mode is selected.

The FL mode setting switch 11, the UP key 6, the DOWN key 7 and the shutter button 9 comprise a push key, respectively.

A card insertion slit 17 for receiving the memory card 8 and a battery cavity 18 are positioned on the bottom face of the main body 2. The slit 17 and the battery cavity 18 are covered with a clam-shell type cover 15. The digital camera 1 is loaded with a power supply source E consisting of four AA batteries connected in series.

Figure 4:
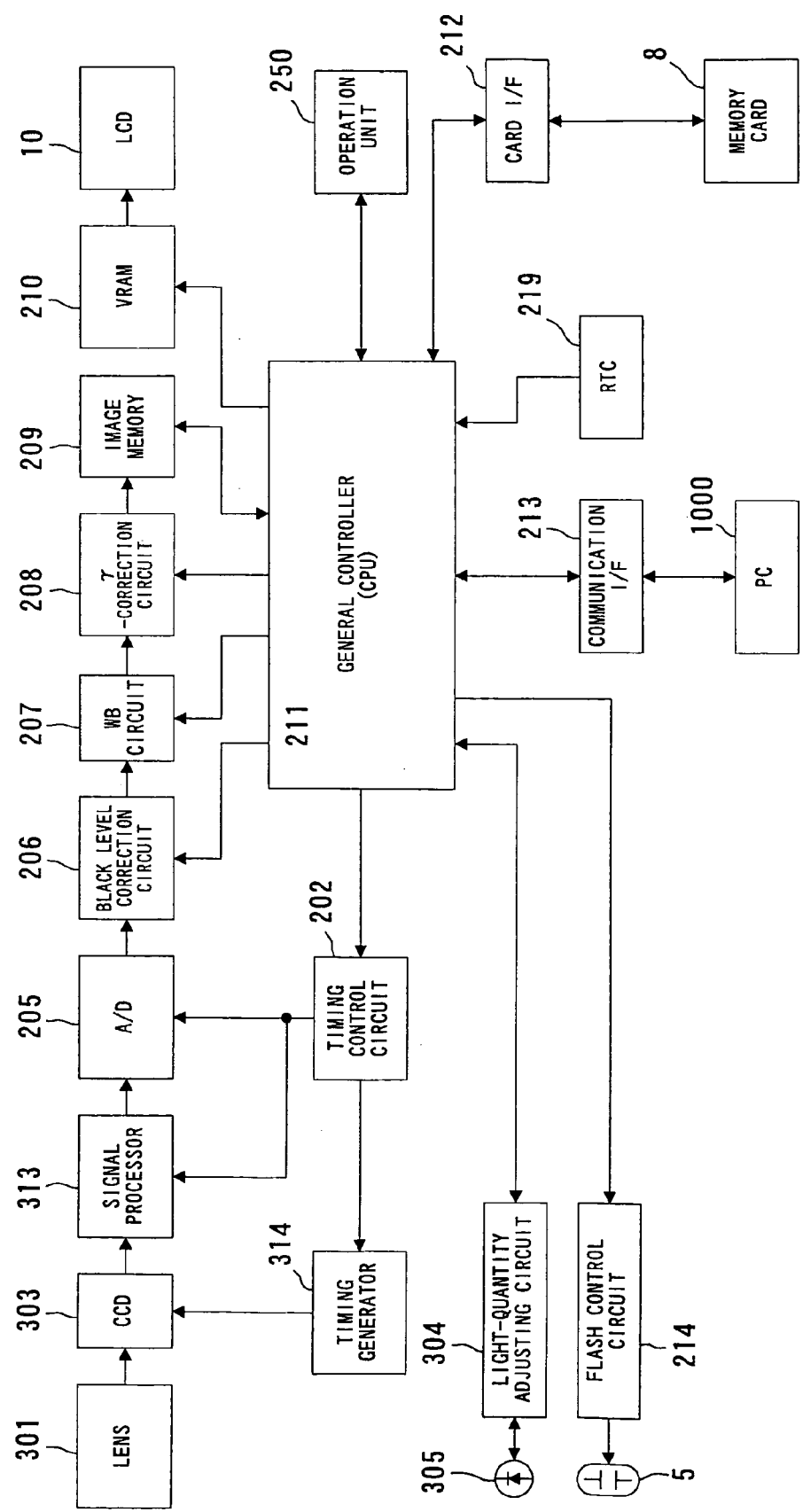
FIG. 4 is a block diagram of the control system of the digital camera shown in FIGS. 1 through 3.

FIG. 4 is a block diagram of the control system of the digital camera 1.

The CCD 303 in the photographing unit 3 photoelectrically converts the optical image of the object focused by the zoom lens 301 into image signals of three color components R (red), G (green) and B (blue), and outputs the image signals to the signal processor 313. This image signal consists of sequence of pixel signals received by the respective pixels. A timing generator 314 generates various timing pulses for controlling and driving the CCD 303.

Since the diaphragm of the photographing unit 3 is fixed, the exposure of the photographing unit 3 is controlled by adjusting the quantity of exposure of the CCD 303, that is, the charge accumulation time of the CCD 303, which correspond to the shutter speed. If the luminance of the object is too low to select to an appropriate shutter speed, the level of the image signal output from the CCD 303 is adjusted in order to compensate for the insufficient exposure.

In other words, at a low luminance, the exposure is controlled by adjusting both the shutter speed and the gain. The level of the image signal is adjusted by controlling the gain of the AGC circuit in the signal processor 313.

The timing generator 314 generates various driving control signals for the CCD 303 based on the reference clock supplied from the timing control circuit 202. The signals generated by the timing generator 314 includes a timing signal for starting and finishing integration (i.e., exposure), and clock signals (horizontal synchronization signals, vertical synchronization signals, transfer signals, etc.) for controlling the reading timing of the light-receiving signals from the respective pixels. These timing signals are supplied to the CCD 303.

The signal processor 313 applies prescribed analogue signal processing to the analog image signal output from the CCD 303. The signal processor 313 has a CDS (correlation double sampling) circuit for reducing the noise of the image signal and an AGC (automatic gain control) circuit for adjusting the level of the image signal by controlling the gain of this AGC circuit.

The light-quantity adjusting circuit 304 controls the light emission of the built-in flash device 5 to a predetermined level determined by the general controller 211 when the flash device is used during the photographing. During the flash photographing, the flash light reflected from the object is received by the photo sensor 305 upon starting exposure. When the quantity of light received by the sensor 305 reaches a predetermined level, the light-quantity adjusting circuit 304 supplies a flash stop signal to the flash control circuit 214 via the general controller 211. In response to the flash stop signal, the flash control circuit 214 stops the light emission of the built-in flash device 5, whereby the light emission amount of the built-in flash device 5 can be regulated to the prescribed level.

The A/D converter 205 provided in the main body 2 of the digital camera 1 converts each pixel signal (i.e., analog signal) of the image signal sequence into a 10-bit digital signal based on the A/D conversion clock supplied from the A/D clock generator (not shown).

A reference clock/timing generator 314 and a timing control circuit 202 are also provided in the main body 2. The timing control circuit 202 is controlled by the general controller 211, and generates a clock for the A/D converter 205.

A black level correction circuit 206 corrects the black level of the digitalized pixel signal (hereinafter referred to as pixel data) converted by the A/D converter 205 to the reference black level. A white balance circuit (hereinafter referred to as WB circuit) 207 converts the level of the pixel data of each color component of R, G or B, so that the white balance can be adjusted after γ (gamma) correction. The WB circuit 207 converts the level of the pixel data of each color component R, G, B using a level conversion table input from the general controller 211. The conversion coefficient (or the slope of the characteristic line) for each color component in the level conversion table is set each photographed image by the general controller 211.

The γ correction circuit 208 corrects for the γ characteristic of the pixel data. The γ correction circuit 208 has, for example, six γ correction tables with different γ characteristics, and uses the most appropriate γ correction table according to the photographed scene or the photographic conditions.

An image memory 209 stores the pixel data output from the γ correction circuit 208. The memory capacity of the image memory 209 corresponds to one frame data. Accordingly, if the CCD 303 has an n×m pixel matrix, the image memory 209 has a memory capacity of n×m pixel data, and each pixel data is stored in the corresponding pixel position in the memory.

A VRAM 210 is a buffer memory for storing the image data which is to be reproduced and displayed on the LCD 10. The VRAM 210 has a memory capacity corresponding to the number of pixels to be photographed by the CCD 10.

In the photographing preparation mode, each pixel data of the image taken by the photographing unit 3 every 1/30 seconds is subjected to the prescribed signal processing by the sequence from the A/D converter 205 to the γ correction circuit 208, and stored in the image memory 209. This pixel data is simultaneously transferred to the VRAM 210 via the general controller 211, and displayed on the LCD 10. The user can see the photographed object (live-view image) on the LCD 10. In the reproduction mode, the image read out from the memory card 8 is subjected to the prescribed signal processing by the general controller 211, which is then transferred to the VRAM 210, and displayed on the LCD 10. A card I/F 212 is an interface for writing and reading image data into and from the memory card 8. A communication I/F 213 is an interface based on, for example, the USB standard, or an interface for wireless communication for externally connecting the PC 1000.

A flash control circuit 214 controls light emission of the built-in flash device 5. In particular, the flash control circuit 214 controls the quantity of flash light, flash timing, and so on, based on the control signal supplied from the general controller 211. The flash control circuit 214 also brings the light emission to zero based on the flash stop signal STP input from the light-quantity adjusting circuit 304.

An RTC (Real Time Clock) 219 is a time circuit for keeping the track of the date and time of each photograph, which is driven by a separate power source (not shown).

An operation unit 250 is an I/F for the general controller 211 and includes the UP key 6, the DOWN key 7, the shutter button 7, the FL mode setting key 11, the compression rate setting key 12, and the photographing/reproduction mode setting switch 14 and the like.

The general controller 211 is composed of a microcomputer, and it organically controls the driving timing of each element in the photographing unit 3 and the main body 2 so as to generally control the photographing operation of the digital camera 1.

If, in the photographing mode, the shutter button 9 is pressed to start photographing, the general controller 211 creates tag information (such as the frame number, exposure value, shutter speed, compression rate K, photographing date and time, flash ON/OFF data, scene information, image determination result, etc), store the tag information in the memory card 8, together with the thumbnail image created from the image taken in the image memory 209 after the start of the photographing operation, and the compressed image created by a JPEG method at a predetermined compression rate K.

The memory card 8 can store forty frames of images taken by the digital camera 1 at a compression rate of 1/20. Each of the frames has tag information, high-resolution image data (640×480 pixels) compressed by a JPEG method, and thumbnail image data (80×60 pixels). Each frame may be treated as an image file of, for example, an EXIF format.

Figure 5:
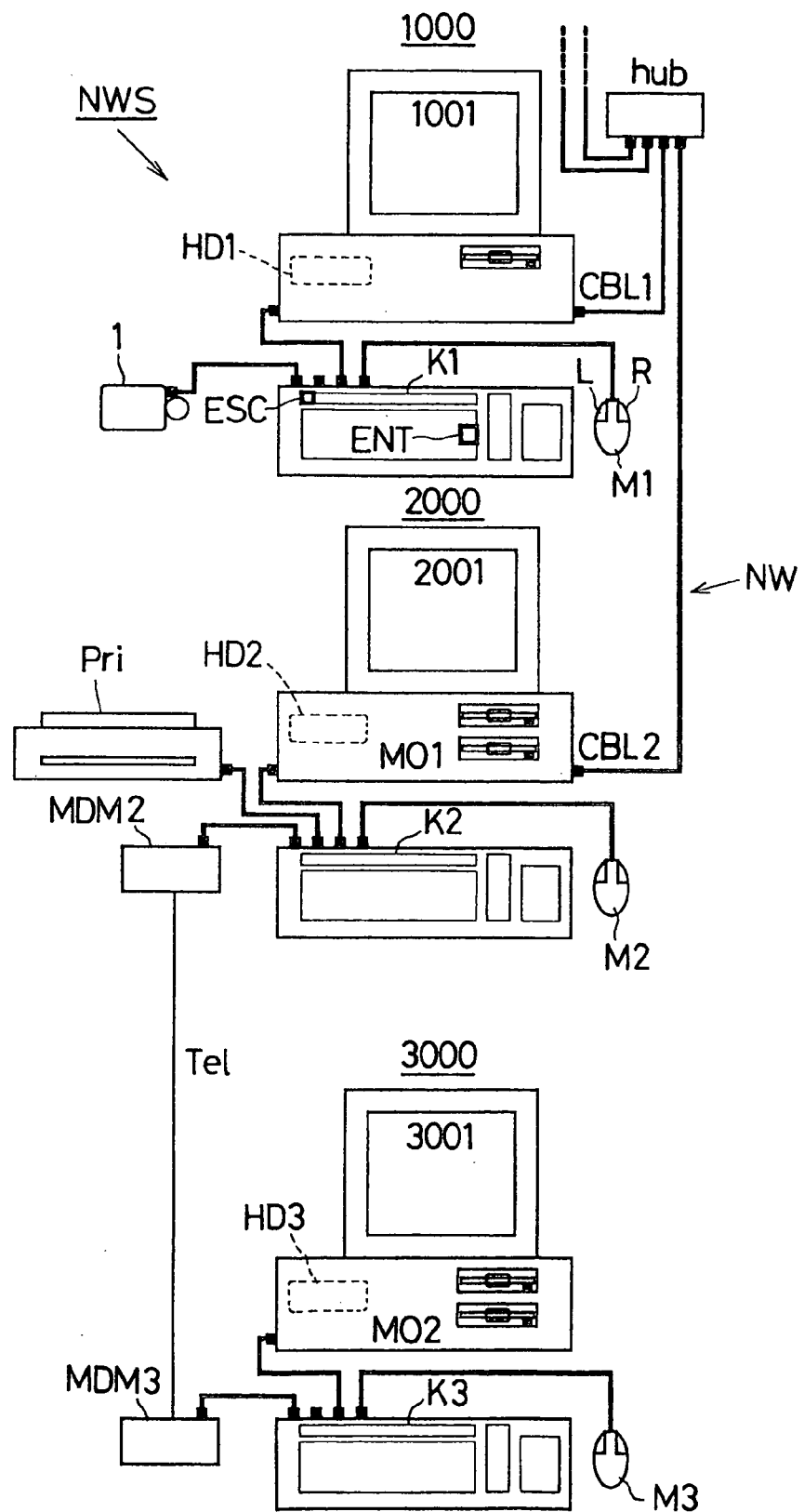
FIG. 5 illustrates an entire arrangement of the network system according to the embodiment of the present invention.

FIG. 5 illustrates the overall structure of the network system using the digital camera described above.

In the network system (NWS) according to this embodiment, in addition to the desktop computer PC 1000, a second computer PC 2000 is connected to the network (NW) via the network hub (hub) and the ethernet cables CBL1 and CBL2. Although not shown in the figure, some other computers are also connected to the network NW. A modem MDM2 is connected to the second computer PC 2000 via the USB port. The second computer PC 2000 can communicate with a remote computer PC 3000, to which a modem MDM3 is connected, via another network NET using the telephone line (Tel).

Keyboards K1, K2 and K3, each having a return key ENT and an escape Key ESC, and mouses M1, M2 and M3 are connected to the main bodies of the computers PC 1000, PC 2000 and PC 3000, respectively, via the USB cables. The computers also have hard disc drives HD1, HD2 and HD3.

Driver software for detecting the connection of the digital camera 1 is installed in the hard disc drive HD1 of the first computer PC 1000. Magneto-optic discs MO1 and M02 are also available in the second PC 2000 and the remote PC 3000. A printer Pri is connected to the second PC 2000 via the USB interface.

Figure 7A:
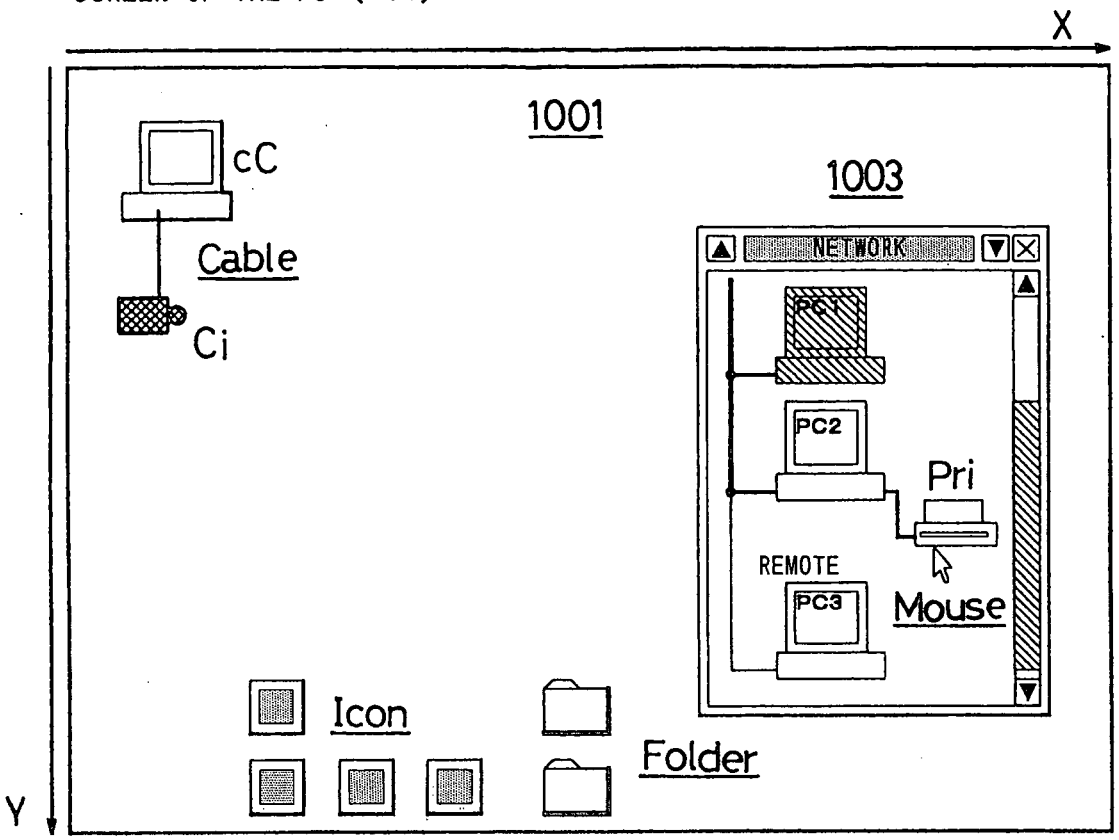
FIG. 7(a) illustrates the monitor screen of the personal computer when the digital camera is connected to the personal computer.
Figure 7B:
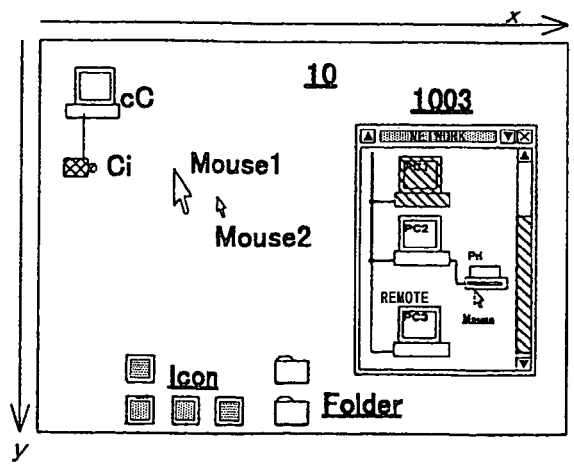
FIG. 7(b) illustrates the corresponding display screen of the digital camera.

If the digital camera 1 is connected to the USB port of the keyboard K1 of the PC 1000 when the computers PC 1000, PC 2000 and PC 3000 are in the ON states, an icon Ci representing the digital camera 1 is displayed on the monitor screen 1001 of the PC 1000, as shown in FIG. 7(*a*). Besides the camera icon Ci, data/application icons (Icon), holder icons (Folder), and an icon (cC) representing the computer itself are also displayed on the monitor screen 1001. A window 1003 is opened in this example. Since the digital camera 1 is now in connection with the PC 1000, a cable is displayed between the camera icon Ci and the computer icon cC on the monitor screen 1001.

The window 1003 is open to indicate the hardware sources connected to the network NW, and the entire arrangement of the network NW shown in FIG. 5 is graphically shown in this window.

Symbols PC1, PC2, and PC3 are assigned to the computers PC 1000, PC 2000 and PC 3000 in the monitor screen.

Figure 6:
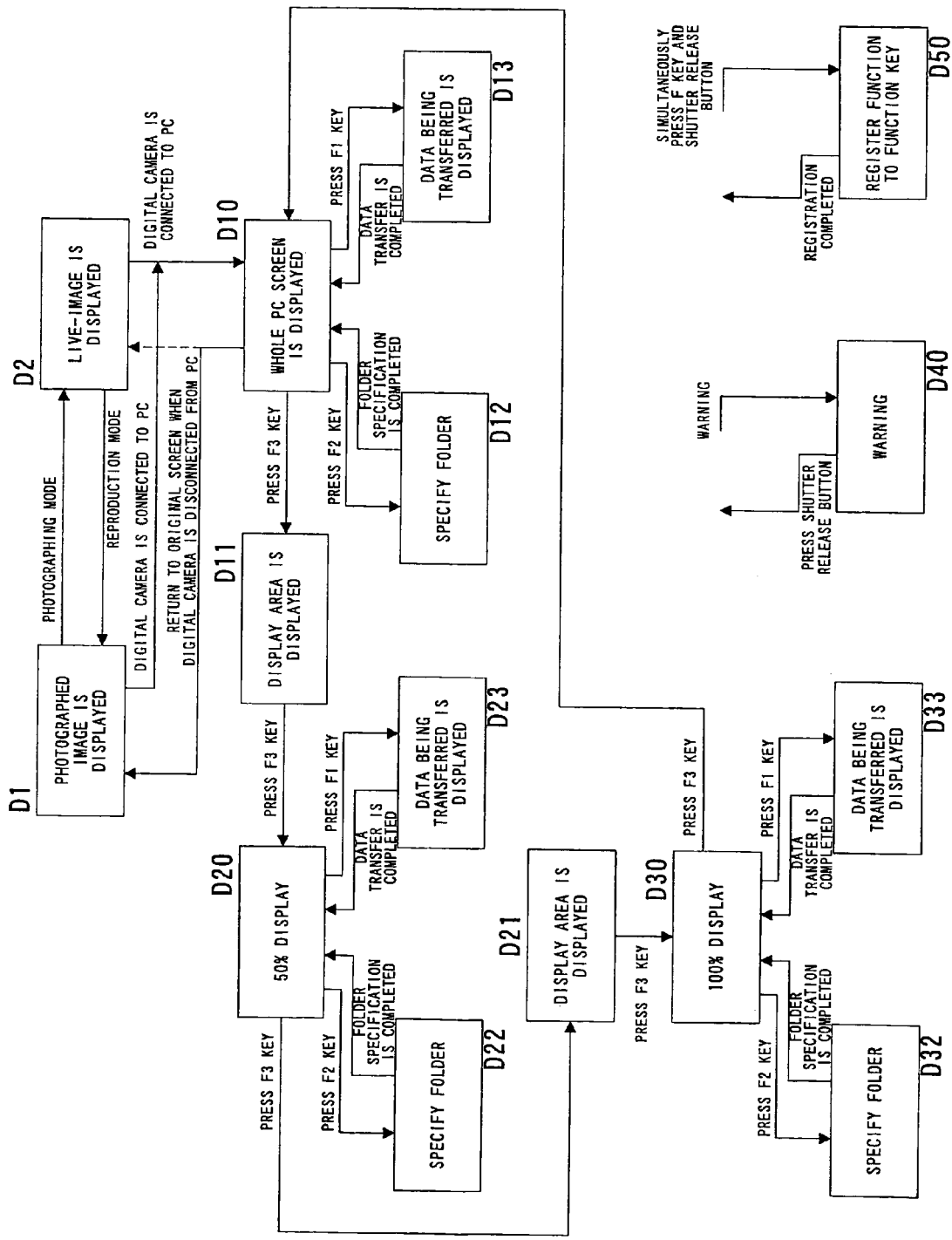
FIG. 6 illustrates transition of the display windows in the network system shown in FIG. 5.

FIG. 6 shows a screen transition diagram of the network system. The relationship between the digital camera 1 and the first PC 1000 is mainly explained as follows.

In FIG. 6, in a case where the digital camera 1 is not connected to the computer PC 1000, it is possible for the user to select a preferable mode between the reproduction mode and the photographing mode by operating the mode setting switch 14. In the reproduction mode, the photographed image is displayed on the display 10 of the digital camera 1 (D1), and in the photographing mode, a live-view image is displayed on the display 10 of the digital camera 1 (D2).

In either state D1, D2, when the digital camera 1 is connected to the first PC 1000, the driver software pre-installed in the first PC 1000 detects the connection of the digital camera 1, and the screen 1001 of the PC 1000 transits to the screen D10 shown in FIG. 7(*a*). At the same time, the screen of the display 10 of the digital camera 1 also transits to the screen D10 shown in FIG. 7(*b*). On the other hand, when the digital camera 1 is disconnected from the first PC 1000, the screen 1001 of the PC as well as the screen of the digital camera 1 (D10) return to the original screen (D1 or D2), respectively.

In the screen D10, as shown in FIGS. 7(*a*) and 7(*b*), the screen of the display 10 of the digital camera 1 coincides with that of the display 1001 of the first PC 1000. However, the display 10 of the digital camera 1 has a resolution of 240×320 dots, and the display of the PC 1000 has a resolution of 600×800 dots, for example. Therefore, the display 10 of the digital camera 1 displays by thinning out the whole screen of the PC. (X, Y) and (x, y) denote X-Y coordinates of the display of the PC 1000 and the display 10 of the digital camera 1, respectively, and the unit of each coordinate is a pixel. This directly corresponds to the address of VRAM (Video RAM).

If the mouse cursor displayed on the display 1001 of the PC 1000 is also reduced to be displayed on the display 10 of the digital camera 1, the mouse cursor is displayed as an arrow marked "Mouse 2" shown in FIG. 7(*b*), which is very hard to be recognized on the display 10 of the digital camera 1. To avoid this disadvantage, only the mouse cursor is not reduced to be displayed on the display 10 of the digital camera 1 as an arrow marked "Mouse 1" shown in FIG. 7(*b*).

In accordance with the operation of the trackball TR of the digital camera 1, not only the mouse cursor on the screen of the PC 1000 but the mouse cursor on the display of the digital camera 1 move in a synchronized manner. This allows the user to drag the icon, or to manipulate the button on the window, for example, as if the user operates the PC 1000 by using the mouse thereof. The relationship between the operation switches (manipulation devices) of the digital camera and the manipulation devices of the PC is shown in Table 1. As is apparent from the Table 1, it is possible for the user not only to move the mouse cursor but to operate the PC by operating the switch of the digital camera 1 corresponding to the manipulation device of the PC 1000.

TABLE 1

| Switches of the digital camera | Manipulation devices of the PC |
| --- | --- |
| Trackball TR | Mouse M |
| DOWN key 7 | Left button L of the mouse |
| UP key 6 | Right button R of the mouse |
| Shutter button 9 | Enter key ENTER |
| FL mode setting switch 11 | Escape key ESC |

Figure 8A:
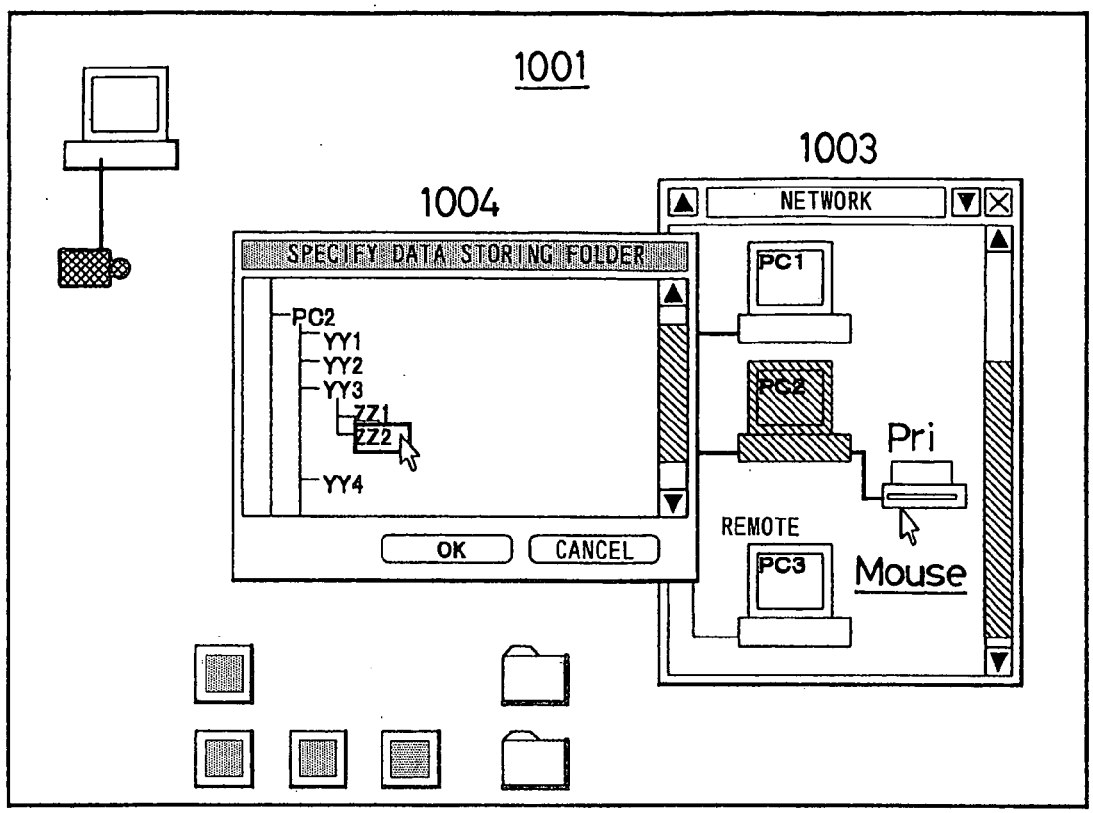
FIG. 8(a) illustrates the monitor screen of the personal computer when the function key F2 of the digital camera is manipulated on the camera side.
Figure 8B:
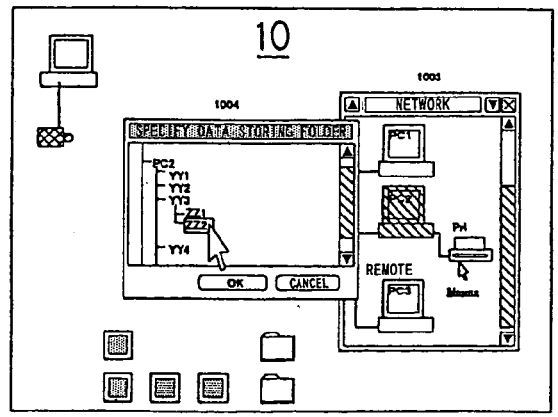
FIG. 8(b) illustrates the corresponding display screen of the digital camera.

If the function key F2 is pressed, the screen transits to the folder specify screen D12 as shown in FIGS. 8(*a*) and 8(*b*). The function key F2 is used to specify a folder when the photographed data of the digital camera 1 is transferred to the PC 1000. When the function key F2 is pressed, the dialogue 1004 for specifying a folder to store the photographed data is displayed on the screen 1001 of the PC 1000. At the same time, as shown in FIG. 8(*b*), the same dialogue is displayed on the display 10 of the digital camera 1.

In this dialogue 1004, the folders PC2\YY3\ZZ2 in the Magneto-optic disc M02 of the PC 2000 is specified as a folder for storing the photographed data of the digital camera 1. By scrolling this dialogue, any folder of a desired PC (including the PC 3000 which is connected to the network via the telephone line Tel, the modem MDM2 and the modem MDM3) connected to the network can be specified. Thus, any desired folder in the PC 1000, PC 2000 and PC 3000 can be specified for storing the photographed data of the digital camera.

As shown in FIG. 8, if the folder PC2\YY3\ZZ2, for example, is selected and then clicked, the folder is framed. In this state, if the OK button is clicked (the mouse cursor is moved onto the OK button by using the trackball TR, and then the DOWN key 7 is pressed), the dialogue is closed in a state that the folder is selected, and returns to the screen D10. Thus, a folder of the PC in which the photographed data is to be stored can be specified by the digital camera 1 side.

Figure 9A:
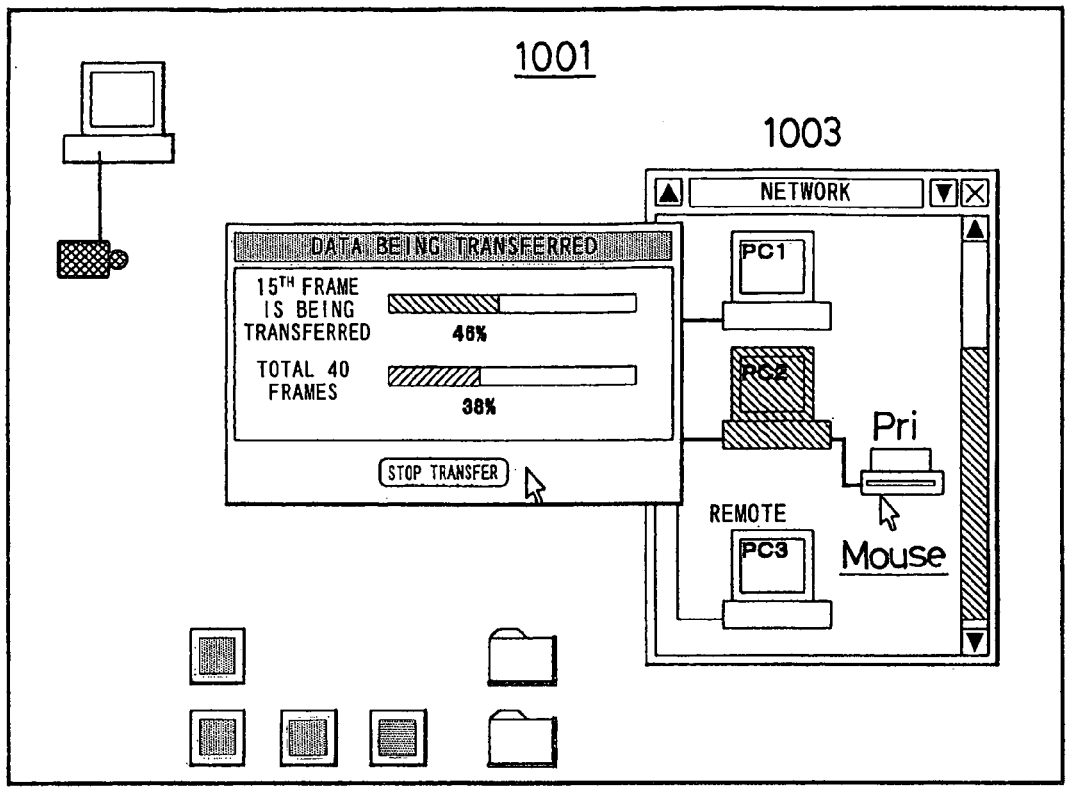
FIG. 9(a) illustrates the monitor screen of the personal computer when the function key F1 of the digital camera is manipulated on the camera side.
Figure 9B:
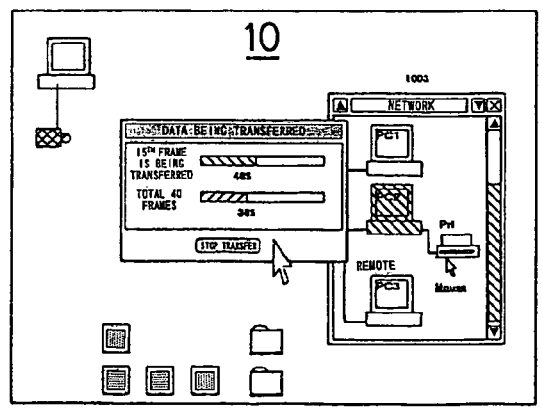
FIG. 9(b) illustrates the corresponding display screen of the digital camera.

Next, in FIG. 6, if the function key F1 is pressed, the screen transits to the photographed data transit screen D13 shown in FIGS. 9(*a*) and 9(*b*). In the function key F1, a function for executing a transfer of the photographed data of the digital camera 1 to the PC 1000 is previously registered. When the function key F1 is pressed, a dialogue showing that the photographed data is being transferred is displayed on the display 1001 of the PC 1000. At the same time, as shown in FIG. 9(*b*), the same dialogue is displayed on the display 10 of the digital camera 1. This dialogue includes an upper progress bar showing the current transferring frame number and its current state and a lower progress bar showing the total number of frames to be transferred and its current state. By pressing the transfer stop button, it is possible for the user to interrupt the transferring. After the completion or the interruption of the transfer, the screen returns to D10.

If the function key F3 is pressed in the screen D10, the screen D10 transits to a display area change screen D11 in accordance with the display magnification rate change at the digital camera 1. In a case where it is too small for the user to recognize the screen 1001 of the PC 1000 in a whole display screen D10, by pressing the function key F3 twice, the display magnification rate is changed to 50%. The "50%" means that the thinning out rate of the displayed data is 50%, in other words, among the whole screen 1001 of the PC 1000 (600×800 dots), twice the area of the display 10 of the digital camera 1 (240×320 dots), i.e., the area of 480×640 dots, is displayed. In the screen D11, a preferable display area is selected.

Figure 10A:
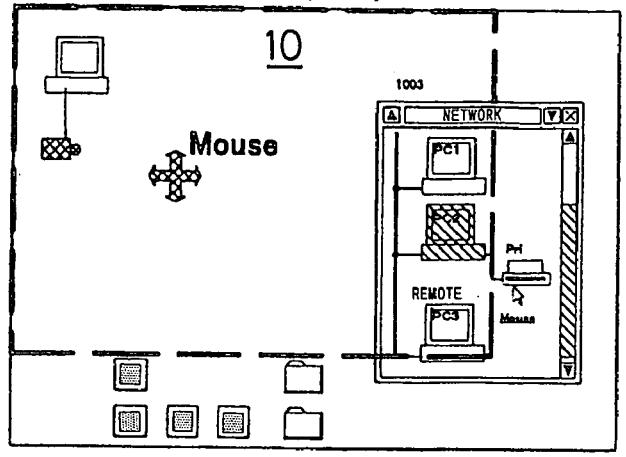
Figure 10B:
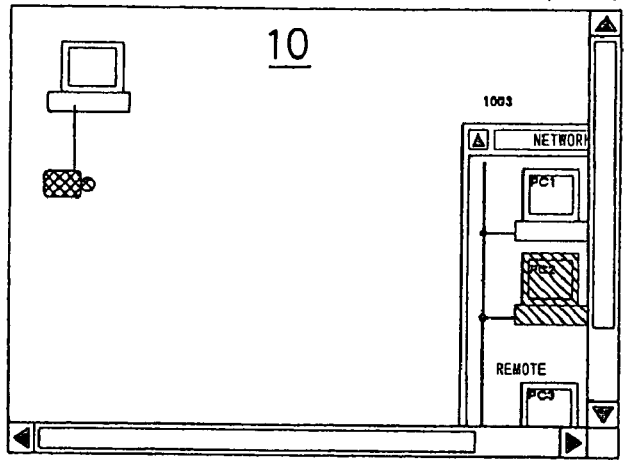
Figure 10C:
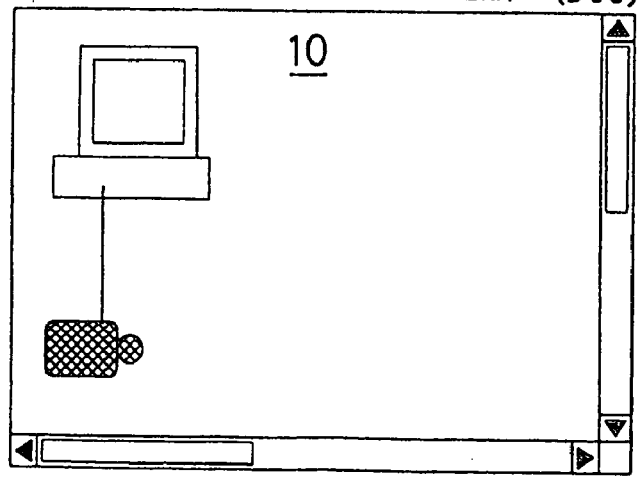

Though the display area change screen D11 shown in FIG. 10 is displayed on the display of the digital camera, the screen of the PC remains D10. In the screen of the digital camera 1, a broken-line frame is displayed at the left side of the screen D10, and the mouse cursor is changed into a moving cursor. The broken-line frame shows a display area when the display magnification rate is set 50%, and can be horizontally moved by operating the trackball TR. By pressing the function key F3 again after the broken-line frame is moved to a desired position, the screen transits to the 50% display screen D20 as shown in FIG. 10(*b*). In the screen D20, though the display magnification rate is different, the relationship between the operation members of the digital camera and the PC is the same as in the screen D10. Since only a portion of the screen of the PC is displayed, vertical and horizontal scroll bars are displayed.

By pressing the function key F3 in the screen D20, a display area change screen is displayed in accordance with the display magnification rate change when the screen D20 transits to the screen D30 shown in FIG. 10(*c*). Though the display magnification rate and the size of the broken-line frame are different from those of the screen D11, the operation is the same as in the screen D11.

By pressing the function key F3 again, the screen transits to the 100% display screen D30. The 100% display screen means that the screen of the PC 1000 of 600×800 dots is displayed on the screen 10 of the digital camera 1 of 240×320 dots without thinning out. Only the area of 240×320 dots among the whole screen of the PC 1000 is displayed as shown in FIG. 10(*c*). By pressing the function key F3, the screen returns to the screen D10.

The data transferring display screen D23, D33, to which the screen D20, D30 transits by pressing the function key F1, is the same as the screen D13 shown FIG. 9, except for the display magnificent rates and the scroll bars displayed on the screen 10 of the digital camera 1. The folder specifying screen D22, D32, to which the screen D20, D30 transits by pressing the function key F2, is the same as the screen D12 shown in FIG. 8, except for the display magnificent rates and the scroll bars displayed on the screen 10 of the digital camera 1.

As explained above, the digital camera 1 can be connected to the PC 1000 (PC 2000, PC 3000) connected to the network NW as a part of the network and the photographed data can be processed by the operation of the digital camera 1 side. Accordingly, the digital camera 1 becomes a part of the network without adding a special function specifically designed for the network to the digital camera 1, which allows the user to utilize various sources such as image data on the network NW.

Further, since no additional spacial functions are required, the digital camera can be kept compact without increasing the power consumption.

In addition, since the second PC 2000 and the remote PC 3000 are connected each other via the telephone line Tel, sources on the network can be utilized without changing the existing apparatuses.

Next, the warning screen D40 shown in FIG. 6 will be explained.

Figure 11A:
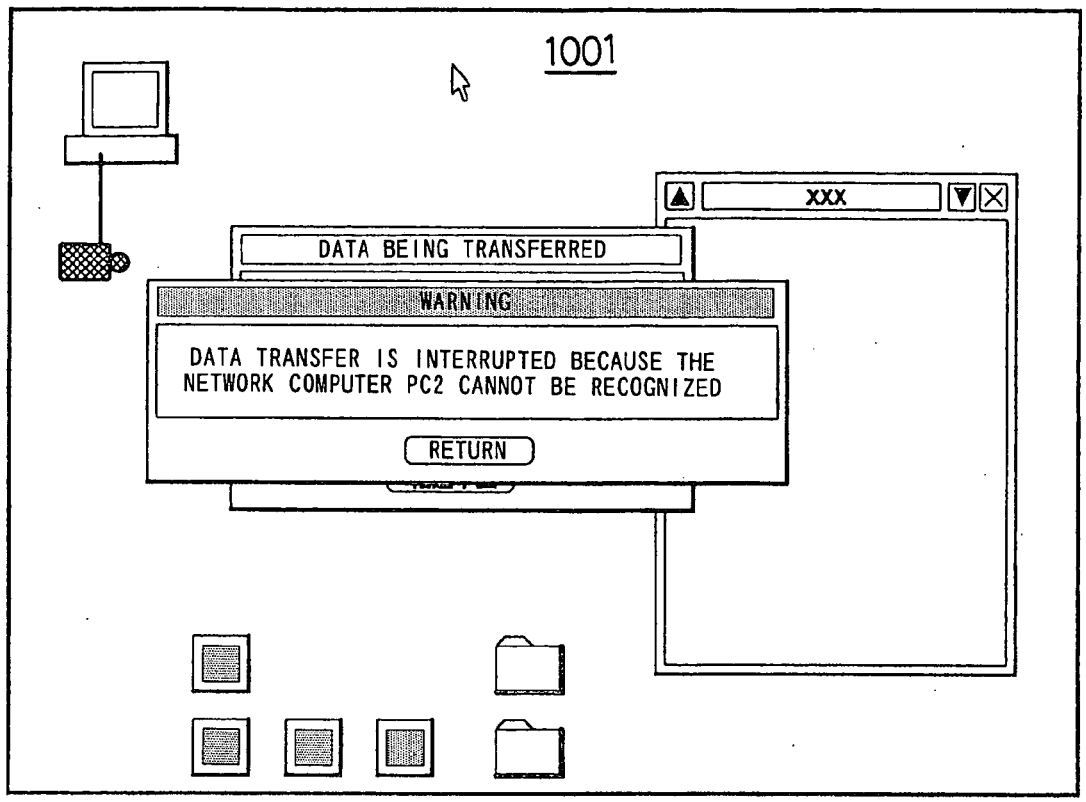
FIGS. 11(a)–11(b) illustrate the warning window opened in the monitor screen of the personal computer when the digital camera is connected to the personal computer.
Figure 11B:
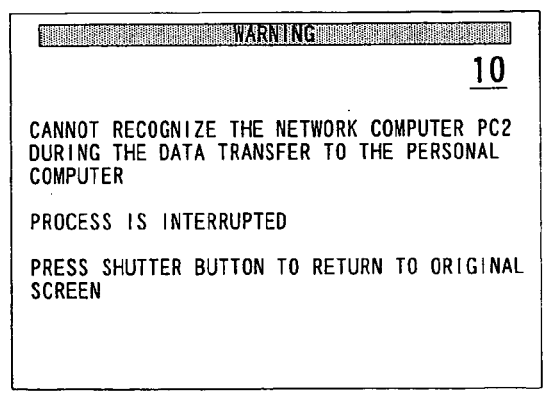

In a case where some warning is required as a system NWS in which the digital camera 1 is connected to the PC 1000, the screen transits to the warning screen D40. The following is an example of a warning when the PC 2000 is disconnected from the network NW during the data transferring, with reference to FIGS. 11(*a*) and 11(*b*). When the PC is disconnected from the network, a warning dialogue is displayed on the centre portion of the screen 1001 of the PC 1000, as shown in FIG. 11(*a*). On the other hand, displayed on the display 10 of the digital camera 1 is a warning message only as shown in FIG. 11(*b*). The reason why the warning screen of the PC and that of the digital camera are different is as follows.

In a case where a warning dialogue is to be displayed, it is required to convey some messages to the user. However, as mentioned above, even if the display 1001 of the PC 1000 can appropriately display a warning dialogue, the display 10 of the digital camera 1 may not be able to appropriately display the same dialogue because of the different resolution of the display 10 of the digital camera 1 and the display 1001 of the PC 1000. Accordingly, although the screen 10 of the digital camera 1 and the screen 1001 of the PC 1000 are synchronized in a normal state, in a case where a warning dialogue is to be displayed, the warning message is surely conveyed to the user by displaying in a different manner between the digital camera 1 and the PC 1000.

The synchronized control of the screen of the digital camera 1 and that of the PC 1000 when it is determined if an event is occurred, will be explained as follows, with reference to the flowchart of FIG. 12.

In the following explanation, though the first PC 1000 is exemplified as a PC, the other PC such as PC 2000 or PC 3000 may also be applied in the same manner.

Figure 12:
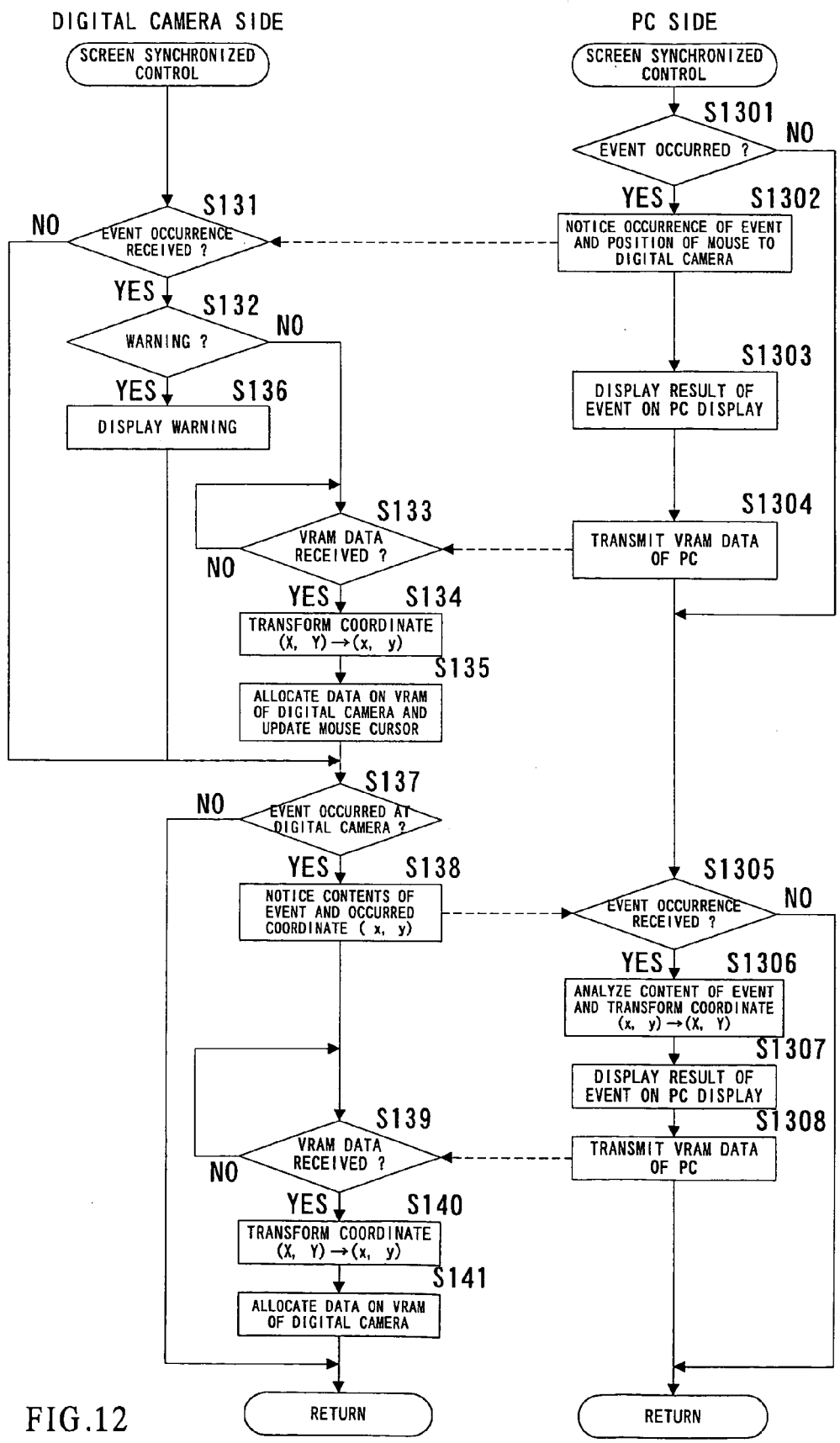
FIG. 12 is a flowchart of the synchronized control for the personal computer and the digital camera.

In FIG. 12 and the following explanation, "Step" will be referred to as "S".

1. In a Case where an Event is Occurred in the PC.

In step S1301, it is determined if the PC 1000 detected an event, such as a connection of the digital camera 1, an operation of the key board K1 or the mouse M1, an error and an interruption from the outside, is occurred. If such an event is detected (YES in S1301), the fact that an event is occurred and the content of the event as well as the position of the mouse M1 of the PC 1000, is noticed to the digital camera 1 in S1302, and the result of the event is displayed on the screen 1001 of the PC in S1303. Thus, the VRAM (video RAM) data of the PC 1000 is updated. Thereafter, the PC 1000 transmits the VRAM data to the digital camera 1 in S1304.

In Step 131, if the digital camera 1 receives an event signal from the PC 1000, the digital camera 1 analyses it and determines if a warning is concerned with an error in S132. If NO in S132, the digital camera 1 waits to receive a VRAM data from the PC 1000 in S133.

If the digital camera 1 receives the VRAM data from the PC 1000 (YES in S133), a coordinate transformation is conducted in S134. This transformation is to allocate the coordinate (X, Y) of the VRAM data transmitted from the PC 1000 into the coordinate (x, y) of the VRAM of the digital camera 1. The process differs depending on the current screen mode of the PC 1000 or that of the digital camera 1. Provided that the screen of the PC 1000 has 600×800 dots, the screen of the digital camera 1 has 240×320 dots and that the screen of D10, D12 or D13 in which the whole screen of the PC is displayed is displayed, x and y will be allocated to x=320/800·X, y=240/600·Y, respectively.

After transforming the coordinate, in S135, the received data are allocated on the VRAM address (x, y) of the digital camera 1. Thus, the screen 10 of the digital camera 1 coincides with the screen 1001 of the PC 1000. Further, in S135, only the data of the mouse cursor are formed by the digital camera 1 based on the position data received in S133, and are updated on the allocated data.

If the event received in S132 is a warning, a warning screen D40 is displayed in S136.

Thus, the process in a case where an event is occurred at the PC side, terminates.

2. In a Case where an Event is Occurred in the Digital Camera.

If an event is occurred in the digital camera 1 by operating the switches of the digital camera 1 in S137, the content of the event and the coordinate (x, y) at which the event is occurred are noticed to the PC 1000 in S138. In Step 1305, the PC 1000 receives the event and analyses it, and then transforms the coordinate into (X, Y) corresponding to the screen of the PC 1000. The transformation can be performed by calculating X=800/320·x and Y=600/240·y, each of which is a reversed operation expression of the above operation expression. Then, in S1307, the result of the event is displayed on the screen 1001 of the PC 1000 and the VRAM data of the PC 1000 is updated. In S1308, the VRAM data of the PC 1000 is transmitted to the digital camera 1.

On the other hand, in S139, the digital camera 1 waits the updated VRAM data of the PC after notifying the PC 1000 of the occurrence of the event in S138. If the digital camera 1 received the data, in S140, a coordinate transformation, which is similar to that in S134, is conducted to allocate the data on the VRAM of the digital camera 1 in S141.

The reason why the event is notified to the PC 1000 to update the screen corresponding to the event at the PC 1000 side and then the updated screen is transmitted to the digital camera 1 again is as follows. If calculated based on the (x, y) system which is poor in screen resolution, and then the calculated data are corrected by the (X, Y) system, a computational error occurs, which causes a screen disorder of the PC 1000.

A method for registering an action to function keys F1–F3 will be explained, with reference to FIGS. 6 and 13.

By simultaneously pressing both the function keys F1–F3 and the shutter button 9, the screen transits to D50, regardless that the digital camera 1 is connected or not connected to the PC 1000. In this embodiment, the currently registered action of the function key F1 (F2, F3) is displayed as a boldfaced characters with an underline, and is changed to the next function in turn by pressing the UP key 6/the DOWN key 7. By pressing the shutter button 9, the changed results become effective and the screen returns to the screen in which D50 was called. By pressing the FL mode setting key 11, the changed results become invalid and the screen returns to the screen in which D50 was called. In this embodiment, examples of the action include "data transfer" in which the image data photographed by the digital camera 1 is transferred to the PC 1000, "specifying data transfer destination folder" which is used when transferring the image data photographed by the digital camera 1 to the PC 1000, "changing the screen magnification rate" by which the screen display magnification rate of the digital camera 1 is changed when the digital camera 1 is connected to the PC 1000, "turning off the power source of the PC", "displaying the image data in the PC", "executing an application in the PC" and "transferring the image data to the PC immediately after photographing".

Next, a process for printing out the photographed image data will be explained with reference to FIG. 14.

Figure 14:
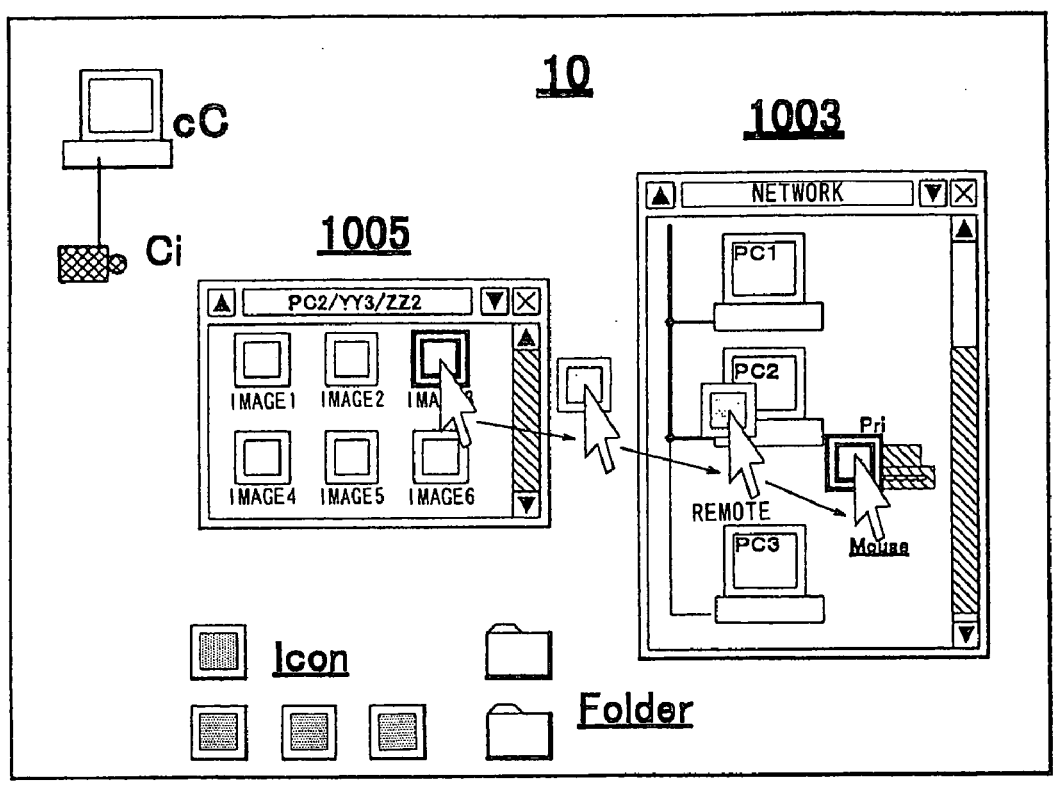
FIG. 14 illustrates the display screen of the digital camera for printing out the image data taken by the digital camera.

The printer connected to the second computer PC 2000 starts a printing operation if the window 1005 showing the folders storing the photographed data is opened in the display screen 10 of the digital camera 1, and a desired folder is dragged to the printer icon shown in the network display window 1003, as indicated by the arrows in FIG. 14.

By manipulating the display screen 10 of the digital camera 1, the user can print out the image data taken by the digital camera 1 from the printer connected to the network NW. Thus, the hard copy of the image data is promptly obtained.

Figure 15:
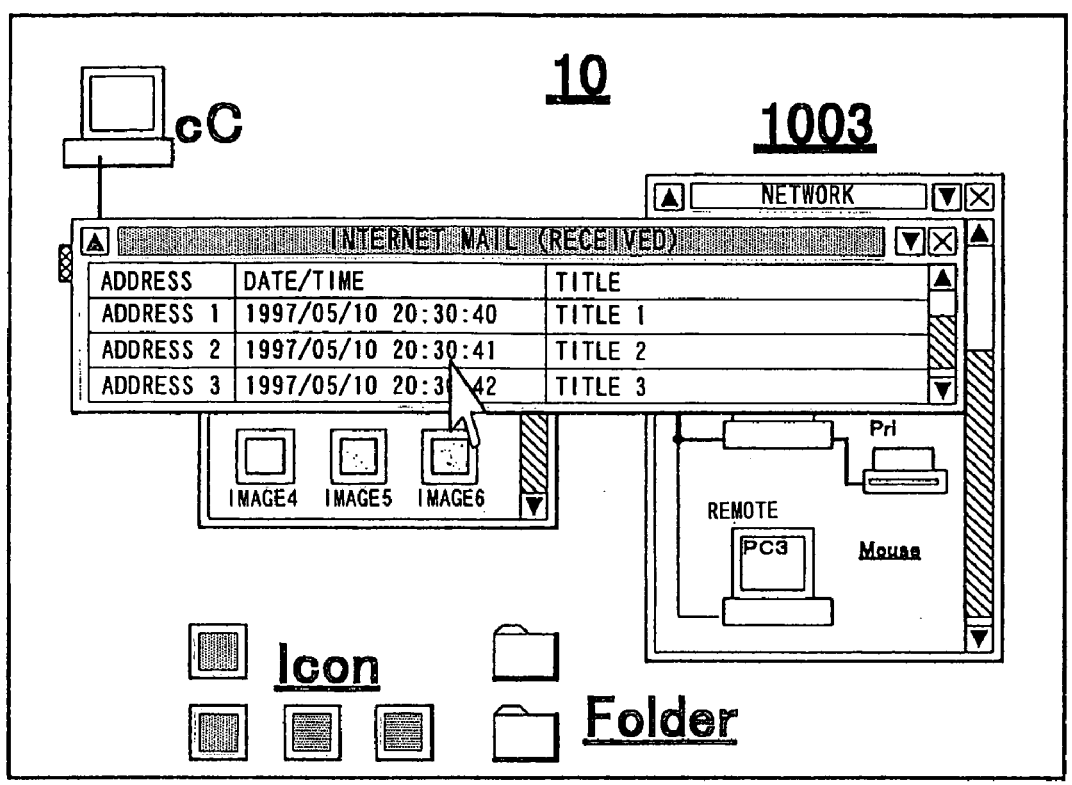
FIG. 15 illustrates the display screen of the digital camera for executing the application software of the personal computer on the digital camera.

Next, a process for executing the application software of the first PC 1000 from the digital camera side will be explained with reference to FIG. 15.

If the icon representing the application software execution file of the fist PC 1000 is selected on the display screen 10 of the digital camera 1, and the shutter button 9 is pressed, then the selected application is activated. In this example, the e-mail software is selected and activated. The application itself is executed in the PC 1000, and the corresponding steps are displayed on the display screen 10 of the digital camera 1, as shown in the flowchart of FIG. 12. The application software activated from the digital camera side is not limited to the e-mail software, but includes any other applications installed in the computers connected to the network. For example, data base software may be activated by manipulating the operation unit of the digital camera 1.

The user can receive and read e-mails using the digital camera 1 in the same manner as activating the e-mail software from the first PC 1000. In this case, the display screen 10 of the digital camera 1 exhibits the same picture as that displayed on the monitor screen 1001 of the first PC 1000. Accordingly, any applications executable in the first PC 1000 can be executed by the digital camera 1 even if such applications are stored in the other media, such as the hard disc drives HD2 or HD3 of the other computers PC 2000 or PC 3000.

In this way, the user can activate a desired application software, for example, the e-mail software, installed in any computers PC 1000, PC 2000, or PC 3000 on the network, and process various data or e-mail by simple manipulations on the digital camera 1.

In this embodiment, three PCs, PC 1000, PC 2000 and PC 3000, are connected to the network, however, other types of computer may be connected.

As has been described above, a digital camera having a display unit which allows data manipulation through it is connected to any one of the computers connected to the network, so that the digital camera itself functions as a part of the network. The network structure is displayed on the display unit of the digital camera, and the user can use and process desired data (e.g., image data) as sources on the network by manipulating the digital camera, while monitoring the network structure on the display unit of the digital camera. Since the user can use any sources on the network through the digital camera, which functions as a communication medium via a network computer, without adding any special functions dedicated to the network, the dimensions of the network media expand, while the power consumption and the size of the digital camera can be maintained small.

If at least two computers are connected to each other via the telephone line, the user can use the network sources from the remote place.

Even if the amount of image data taken by the digital camera become massive, the image data can be stored in the network computer as the network source, and undesirable image data loss can be prevented.

If the user activates and executes an application software stored in the network computer from the digital camera side, the data can be processed using that application software.

For example, if the e-mail software is activated, the user can e-mail using the digital camera.

Furthermore, the user can print out desired image data by activating the printer from the digital camera side, and can obtain the hard copy print immediately.

Although the present invention has been described based on the preferred embodiment, the terms and the sentences used in this specification are explanatory, and not limiting the present invention. It should be appreciated that there are many modifications and substitutions without departing from the spirit and scope of the present invention.

What is claimed is:

1. A photographing apparatus connectable to a network to which a plurality of image processing apparatuses are connected, the photographing apparatus comprising:
   an interface for connecting the photographing apparatus as a peripheral device to a processor that forms a node on the network;
   a display for displaying a network structure when the photographing apparatus is connected to the processor, and for returning to a state in which either a photographed image or a live-view image is displayed when the photographing apparatus is disconnected from the processor; and
   an operation unit for allowing image data taken by said photographing apparatus to be processed on the network.

2. The photographing apparatus according to claim 1, wherein the photographing apparatus is capable of causing any of the image processing apparatuses connected to the network to record the image data photographed by said photographing apparatus.

3. The photographing apparatus according to claim 1, wherein the photographing apparatus is capable of causing a printer connected to the network to print out the image data photographed by the photographing apparatus.

4. A photographing apparatus connectable to a network to which a plurality of image processing apparatuses are connected, the photographing apparatus comprising:
   an interface for connecting the photographing apparatus as a peripheral device to a processor that forms a node on the network;
   a display for displaying a network structure when the photographing apparatus is connected to the processor, and for returning to a state in which either a photographed image or a live-view image is displayed when the photographing apparatus is disconnected from the processor; and
   an operation unit for executing a program recorded in each image processing apparatus connected to the network.

5. The photographing apparatus according to claim 4, wherein the program is an e-mail program.

6. A network system to which a photographing apparatus and a plurality of image processing apparatuses are connected, the photographing apparatus comprising:
   an interface for connecting the photographing apparatus as a peripheral device to a processor that forms a node on the network;
   a display for displaying a network structure when the photographing apparatus is connected to the processor, and for returning to a state in which either a photographed image or a live-view image is displayed when the photographing apparatus is disconnected from the processor; and
   an operation unit for allowing the image data taken by the photographing apparatus to be processed on the network.

7. The network system according to claim 6, wherein the photographing apparatus is capable of causing any of the image processing apparatuses connected to the network to record the image data photographed by the photographing apparatus.

8. The network system according to claim 6, wherein the photographing apparatus is capable of causing a printer connected to the network to print out the photographed image data.

9. A network system to which a photographing apparatus and a plurality of image processing apparatuses are connected, the photographing apparatus comprising:
   an interface for connecting the photographing apparatus as a peripheral device to a processor that forms a node on the network;
   a display for displaying a network structure when the photographing apparatus is connected to the processor, and for returning to a state in which either a photographed image or a live-view image is displayed when the photographing apparatus is disconnected from the processor; and
   an operation unit for executing a program recorded in each image processing apparatus connected to the network.

10. The network system according to claim 9, wherein the program is an e-mail program.

11. A photographing apparatus connectable to a network which includes a plurality of data processing devices, comprising:
    an interface for connecting the photographing apparatus as a peripheral device to one of said data processing devices on the network; and
    a display which displays a network structure when the photographing apparatus is connected to the network and returns to a state in which either a photographed image or a live-view image is displayed when the photographing apparatus is disconnected from the network.

12. The photographing apparatus according to claim 11, further comprising an operation unit for allowing image data taken by the photographing apparatus to be processed on the network.

13. The photographing apparatus according to claim 11, wherein the display substantially mimics a screen display of said one of the data processing devices when the photographing apparatus is connected to said data processing device.

14. The photographic apparatus according to claim 11, wherein at least one of the data processing devices is an image processing apparatus.

15. The photographic apparatus according to claim 11, wherein the at least one of the data processing devices is a printer, and the photographing apparatus is capable of causing the printer to print out image data captured by the photographing apparatus.

16. The photographing apparatus according to claim 11, wherein the data processing devices are connected by way of cables or wireless connection.

17. The photographing apparatus according to claim 12, wherein the photographing apparatus includes a selecting device for selecting at least one application stored on any one of the plurality of data processing devices, and when one application is selected, the operation unit causes the application to execute.

18. The photographing apparatus of claim 1, wherein said processor is a personal computer.

* * * * *